US008010276B2

(12) United States Patent
Oehlerking

(10) Patent No.: US 8,010,276 B2
(45) Date of Patent: Aug. 30, 2011

(54) INTAKE MANIFOLD OXYGEN CONTROL

(75) Inventor: Dale Oehlerking, St. Charles, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 171 days.

(21) Appl. No.: 12/550,628

(22) Filed: Aug. 31, 2009

(65) Prior Publication Data

US 2011/0054763 A1 Mar. 3, 2011

(51) Int. Cl.
*F02B 47/08* (2006.01)
*F02D 41/26* (2006.01)

(52) U.S. Cl. .... 701/106; 701/109; 701/110; 123/568.21

(58) Field of Classification Search .......... 701/103–105, 701/108–110; 123/672, 675, 698, 703, 568.21, 123/399
See application file for complete search history.

(56) References Cited

U.S. PATENT DOCUMENTS

| | | |
|---|---|---|
| 4,809,177 A | 2/1989 | Windle |
| 4,926,331 A | 5/1990 | Windle |
| 5,017,916 A | 5/1991 | Londt |
| 5,018,087 A | 5/1991 | Dannenberg |
| 5,365,436 A | 11/1994 | Schaller |
| 6,016,459 A | 1/2000 | Isaac |
| 6,112,138 A | 8/2000 | Dannenberg |
| 6,188,948 B1 | 2/2001 | Shivler |
| 6,263,269 B1 | 7/2001 | Dannenberg |
| 6,272,402 B1 | 8/2001 | Kelwaski |
| 6,313,742 B1 | 11/2001 | Larson |
| 6,356,822 B1 | 3/2002 | Diaz |
| 6,401,700 B2 | 6/2002 | Balekai et al. |
| 6,430,485 B1 | 8/2002 | Hullinger |
| 6,431,304 B1 | 8/2002 | Smythe |
| 6,584,391 B2 | 6/2003 | Lack |
| 6,618,665 B2 | 9/2003 | Walker |
| 6,654,678 B1 | 11/2003 | Rodriguez |
| 6,698,409 B1 | 3/2004 | Kennedy |
| 6,724,102 B1 | 4/2004 | Kelwaski |
| 6,725,147 B2 | 4/2004 | Mollin |
| 6,801,846 B1 | 10/2004 | Rodriguez |
| 6,842,676 B2 | 1/2005 | Rodriguez |
| 6,850,832 B1 | 2/2005 | Rodriguez |
| 6,907,445 B2 | 6/2005 | Pellegrino |
| 6,934,619 B2 | 8/2005 | Read |
| 6,947,822 B2 | 9/2005 | Martinez, Jr. |
| 6,947,832 B2 | 9/2005 | Rodriguez |
| 6,973,382 B2 | 12/2005 | Rodriguez et al. |
| 6,985,808 B1 | 1/2006 | Kennedy |
| 6,988,029 B1 | 1/2006 | Kennedy |
| 6,990,951 B1 | 1/2006 | Liu |
| 6,993,428 B1 | 1/2006 | Gundrum |
| 7,000,393 B1 | 2/2006 | Wood |

(Continued)

*Primary Examiner* — Hai H Huynh
(74) *Attorney, Agent, or Firm* — Jack D. Nimz; Jeffrey P. Calfa

(57) ABSTRACT

A method for controlling intake manifold oxygen for an engine having a fresh air inlet and an exhaust gas recirculation (EGR) circuit includes the steps of: establishing an ideal excess oxygen ratio for combustion in the engine; calculating a total mass flow of oxygen to be delivered to an intake manifold of the engine to maintain the ideal excess oxygen ratio; determining a mass flow of EGR oxygen in the mass flow of EGR gas; and controlling a desired mass flow of fresh oxygen to be delivered to the intake manifold such that the sum of the desired mass flow of fresh oxygen and the mass flow of EGR oxygen is equal to the desired total mass flow of oxygen, by re-adjusting the EGR valve.

18 Claims, 5 Drawing Sheets

U.S. PATENT DOCUMENTS

| | | |
|---|---|---|
| 7,013,212 B1 | 3/2006 | de Ojeda et al. |
| 7,047,953 B2 | 5/2006 | Kennedy |
| 7,058,502 B2 | 6/2006 | Rodgers |
| 7,130,736 B2 | 10/2006 | Bishop |
| 7,184,877 B1 | 2/2007 | de Ojeda |
| 7,200,485 B2 | 4/2007 | Kennedy |
| 7,277,791 B2 | 10/2007 | Petrosius |
| 7,289,899 B2 | 10/2007 | Rodriguez |
| 7,292,930 B2 | 11/2007 | Zhang |
| 7,349,798 B2 | 3/2008 | Beyene |
| 7,353,648 B2 | 4/2008 | Zhang |
| 7,433,776 B1 | 10/2008 | Hunter |
| 7,461,627 B2 | 12/2008 | Liu |
| 7,530,220 B2 | 5/2009 | Miller |
| 7,536,992 B1 | 5/2009 | Wieshuber et al. |
| 7,715,975 B2 * | 5/2010 | Yamaoka et al. ............. 701/103 |
| 2004/0069281 A1 | 4/2004 | Corba |
| 2004/0181325 A1 | 9/2004 | Rodriguez |
| 2005/0075779 A1 | 4/2005 | Read |
| 2005/0114002 A1 | 5/2005 | Rodgers |
| 2005/0177301 A1 | 8/2005 | Bishop |
| 2005/0177302 A1 | 8/2005 | Rodriguez |
| 2005/0216174 A1 | 9/2005 | Rodriguez |
| 2005/0288846 A1 | 12/2005 | Liu |
| 2006/0005805 A1 | 1/2006 | Liu |
| 2006/0064229 A1 | 3/2006 | Kennedy |
| 2006/0185353 A1 | 8/2006 | Liu |
| 2006/0200297 A1 | 9/2006 | Liu |
| 2007/0084427 A1 | 4/2007 | Petrosius |
| 2007/0129876 A1 | 6/2007 | Zhang |
| 2008/0027618 A1 | 1/2008 | Liu |
| 2008/0078176 A1 | 4/2008 | de Ojeda |
| 2008/0154478 A1 | 6/2008 | Lyons |
| 2008/0184696 A1 | 8/2008 | Wyatt |
| 2008/0319599 A1 | 12/2008 | Ptak |
| 2009/0132153 A1 * | 5/2009 | Shutty et al. .................. 701/108 |

* cited by examiner

INTAKE MANIFOLD OXYGEN CONTROL

FIELD OF THE INVENTION

This invention relates to internal combustion engines, particularly a truck diesel engine that has exhaust gas recirculation control.

BACKGROUND OF THE INVENTION

Diesel engines are powerplants of many trucks that are presently being manufactured in North America.

Diesel engine combustion must be precisely controlled to minimize emissions. Among the factors in determining emission levels is the presence of excess oxygen in the combustion process. Exhaust gas recirculation (EGR) is the process of recirculating a portion of an engine's exhaust back into the engine's cylinders, and it has been used to reduce peak combustion temperatures, lower excess oxygen levels, and reduce NOx emissions.

Typically, diesel engines are equipped with single or two-stage turbochargers. A two-stage turbocharger comprises high- and low-pressure turbines in series flow relationship in the exhaust system that operate high- and low-pressure compressors in series flow relationship in the intake system to develop boost is one example of a turbocharger. A single-stage stage turbocharger has only a single turbine and a single compressor.

U.S. published application 2008/0078176 describes an engine control system for a turbocharged diesel engine wherein, when actual boost deviates from a desired boost set-point developed by a boost control strategy, such as during a sudden acceleration or deceleration, the strategy provides a prompt adjustment of exhaust gas recirculation (EGR) seeking to null out the boost disparity.

U.S. published application 2008/0078176 describes a strategy for control of an EGR valve that establishes a desired EGR set-point based on several parameters, including engine speed, indicated engine torque, and mass flow rate of fresh air entering the intake system. The EGR valve is controlled by a duty-cycle signal that is based on the EGR set-point. Changes in the EGR set-point change the duty cycle of the duty signal through a controller, typically a PID (proportional-integral-derivative) controller embodied as a virtual controller in the processing strategy.

The strategy of U.S. published application 2008/0078176 for control of turbocharger boost establishes a desired boost set-point based on several parameters, including engine speed and indicated engine torque. The boost set-point is processed by a control strategy for controlling the turbocharger, specifically controlling the position of the vanes of a variable geometry turbocharger (VGT). Vane position is typically controlled by an actuator to which a duty-cycle signal based on boost set-point is applied. The duty-cycle signal may also be developed by a PID controller in the boost control strategy.

In accordance with U.S. published application 2008/0078176, various calculations are made. One calculation performed by a suitably appropriate algorithm uses actual boost to provide the mass flow rate through the engine cylinders. Another calculation, performed in any suitably appropriate way, provides the actual mass flow rate of fresh air entering the engine intake system. The mass flow rate of recirculated exhaust gas that mixes with the fresh air entering the intake system is then calculated as the difference between the calculated mass flow rate through the engine cylinders and the actual mass flow rate of fresh air entering the intake system.

The EGR valve is modeled in such a way that for certain prevailing conditions that bear on mass flow rate through the EGR valve, such as exhaust gas temperature and pressure differential between the valve inlet and outlet, a correlation between mass flow rate through the valve and the extent to which the EGR valve is open is defined.

To null out the boost disparity during a sudden acceleration or deceleration, the control system uses the correlation between flow rate through the EGR valve and the extent to which the EGR valve is open to define an adjustment for the valve opening that will adjust the mass flow through the EGR valve in a way that seeks to null out the boost discrepancy.

The control system of U.S. published application 2008/0078176 performs feed-forward adjustment of the mass flow rate of recirculated exhaust gas in a direction of adjustment that seeks to null out the difference between desired boost set point and actual boost. The system processes the data representing the difference between the data representing actual mass flow rate through the engine cylinders and the data representing the expected mass flow rate through the engine cylinders to develop a feed-forward adjustment signal that is applied to the EGR valve to cause the adjustment.

The above described method controls the ratio of EGR gas to fresh air that can be disrupted during transient conditions such as during vehicle acceleration and deceleration.

The present inventor recognizes that in reality, EGR contains a variable amount of oxygen, somewhere from 0% to 21%. With an increased demand for engine improvements in reduced emissions, the assumption that EGR does not contain oxygen presents a limitation for further reducing emissions.

The present inventor recognizes the need for an engine control system for a diesel engine that more closely controls combustion and fuel/air mixtures to provide for reduced emissions and enhanced engine efficiency. The present inventor recognizes the need for an excess oxygen control algorithm that attempts to accurately monitor and precisely control excess oxygen available for combustion in a diesel engine.

SUMMARY OF THE INVENTION

The present invention provides an engine control algorithm that calculates and controls the precise amounts of EGR and fresh air to be delivered into an engine intake manifold to best reduce emissions. This algorithm works as an enhancement to known EGR control strategies such as that disclosed in U.S. published application 2008/0078176, herein incorporated by reference.

According to the algorithm of the present invention, a mass flow rate of oxygen from fresh air is derived from the measured mass flow rate of fresh air, because the percentage of oxygen in fresh air is known. The mass flow rate of EGR gas is measured by the EGR valve position and pressure drop across the valve. Alternately, the mass flow rate of EGR can be determined by the calculated difference between the total mass air flow through the engine and the mass flow of fresh air. The oxygen content of the EGR gas can be either measured by the exhaust gas O2 sensor or determined in an iterative process as the difference between the total mass flow of oxygen, and the product of the fuel rate and the stoichiometric ratio of mass oxygen to mass fuel (3.51). Therefore, the oxygen mass flow rate of the EGR gas can be calculated as the product of the oxygen fraction and the mass flow of EGR gas. The amount of total oxygen flow rate delivered to the intake manifold of the engine is the sum of the oxygen flow rate from the fresh air and the oxygen flow rate from the EGR gas.

In heretofore known EGR control schemes, the position of the EGR valve which determines the amount of EGR during steady state engine operation is controlled by a variety of factors but predominantly engine speed and indicated torque.

When the accelerator is depressed or released, a changed amount of fuel is delivered into the engine. For reducing emissions and for maintaining engine efficiency, the engine control sets a mass air flow rate and the EGR valve is adjusted according to the pre-set relationship programmed into the control, such as described in U.S. published application 2008/0078176. However, this relationship ignores the amount of oxygen present in the EGR gas to estimate the excess oxygen present in the intake manifold for combustion in the engine. According to the added algorithm of the invention, the oxygen contribution of the EGR gas is determined and the set point of the mass flow rate of fresh air is reset such that the total oxygen into the intake manifold is maintained at optimal values according to values pre-programmed into the engine control.

The algorithm of the present invention can cooperate with existing engine control algorithms, particularly algorithms that control the amount of EGR gas delivered into the engine intake manifold. The algorithm of the present invention provides as an output, the set-point for mass flow rate of fresh air for engine control that is used as an input for existing EGR control algorithms, such as described in U.S. published application 2008/0078176.

Accordingly, the method of the present invention for an engine having a fresh air inlet and an exhaust gas recirculation (EGR) circuit, provides the steps of:

establishing the ideal excess oxygen ratio R for combustion in the engine;

establishing a mass flow of EGR gas to be delivered to the intake manifold given total mass flow of both fresh air and EGR gas and adjusting the EGR valve to pass this mass flow of EGR gas;

measuring mass flow of fresh air to the intake manifold to establish a measured mass flow of fresh air;

calculating a desired total mass flow of oxygen to be delivered to an intake manifold of the engine to maintain the ideal excess oxygen ratio;

determining a mass flow of EGR oxygen in the mass flow of EGR gas;

calculating a desired mass flow of fresh oxygen to be delivered to the intake manifold such that the sum of the desired mass flow of fresh oxygen and the mass flow of EGR oxygen is equal to the desired total mass flow of oxygen;

calculating an adjusted mass flow of fresh air to supply the desired mass flow of fresh oxygen;

re-adjusting the EGR valve to change measured mass flow of fresh air in the direction toward the adjusted mass flow of fresh air.

The step of establishing the ideal excess oxygen ratio R is based on a known amount of fuel delivery to the engine and a preferred ratio of mass of oxygen to mass of fuel occurring in combustion. The step of establishing a mass flow of EGR gas can be based on a map or look up table of values that depend on engine speed and indicated torque.

The step of determining a mass flow of EGR oxygen in the mass flow of EGR gas can comprise the steps of: measuring the oxygen content in the mass flow of EGR gas; and measuring the mass flow of EGR gas.

Alternately, the step of determining a mass flow of EGR oxygen in the mass flow of EGR gas can comprise the steps of determining a total mass flow rate of intake manifold air equal to the sum of the mass flow of fresh air and the mass flow of EGR, determining the mass flow rate of exhaust oxygen as the difference between the desired total mass flow of oxygen, and the product of the fuel rate and the stoichiometric ratio of mass oxygen to mass fuel (3.51), determining the fraction of O2 in the exhaust gas by dividing the mass flow rate of exhaust oxygen by the total mass flow rate of intake manifold air, and multiplying the fraction of O2 by the mass flow of EGR gas Also alternately, the step of determining a mass flow of EGR oxygen in the mass flow of EGR gas can comprise the steps of determining a total mass flow rate of intake manifold air from engine speed, engine displacement and density of intake manifold air, measuring mass flow of fresh air from a sensor, subtracting mass flow of fresh air from said total mass of intake manifold air to determine mass flow of EGR gas, determining the mass flow rate of exhaust oxygen as the difference between the desired total mass flow of oxygen, and the product of the fuel rate and the stoichiometric ratio of mass oxygen to mass fuel (3.51), determining the fraction of O2 in the exhaust gas by dividing the mass flow rate of exhaust oxygen by the total mass flow rate of intake manifold air, and multiplying the fraction of O2 by the mass flow of EGR gas.

The step of re-adjusting the EGR valve to change the measured mass flow of fresh air in the direction toward the adjusted mass flow of fresh air is further defined in that a set-point signal for the adjusted mass flow of fresh air is an output value that is produced to be an input value into another, supplemental algorithm for adjusting the EGR valve.

The method steps are repeated rapidly, many times per second.

Principles of the invention can be embodied in an engine control strategy without the inclusion of additional mechanical devices, making implementation of the inventive strategy cost-effective. Moreover, the favorable effect on tailpipe emissions can make a meaningful contribution toward compliance with applicable laws and regulations.

Numerous other advantages and features of the present invention will become readily apparent from the following detailed description of the invention and the embodiments thereof, from the claims, and from the accompanying drawings.

DETAILED DESCRIPTION OF THE PREFERRED EMBODIMENT

Figure 1:
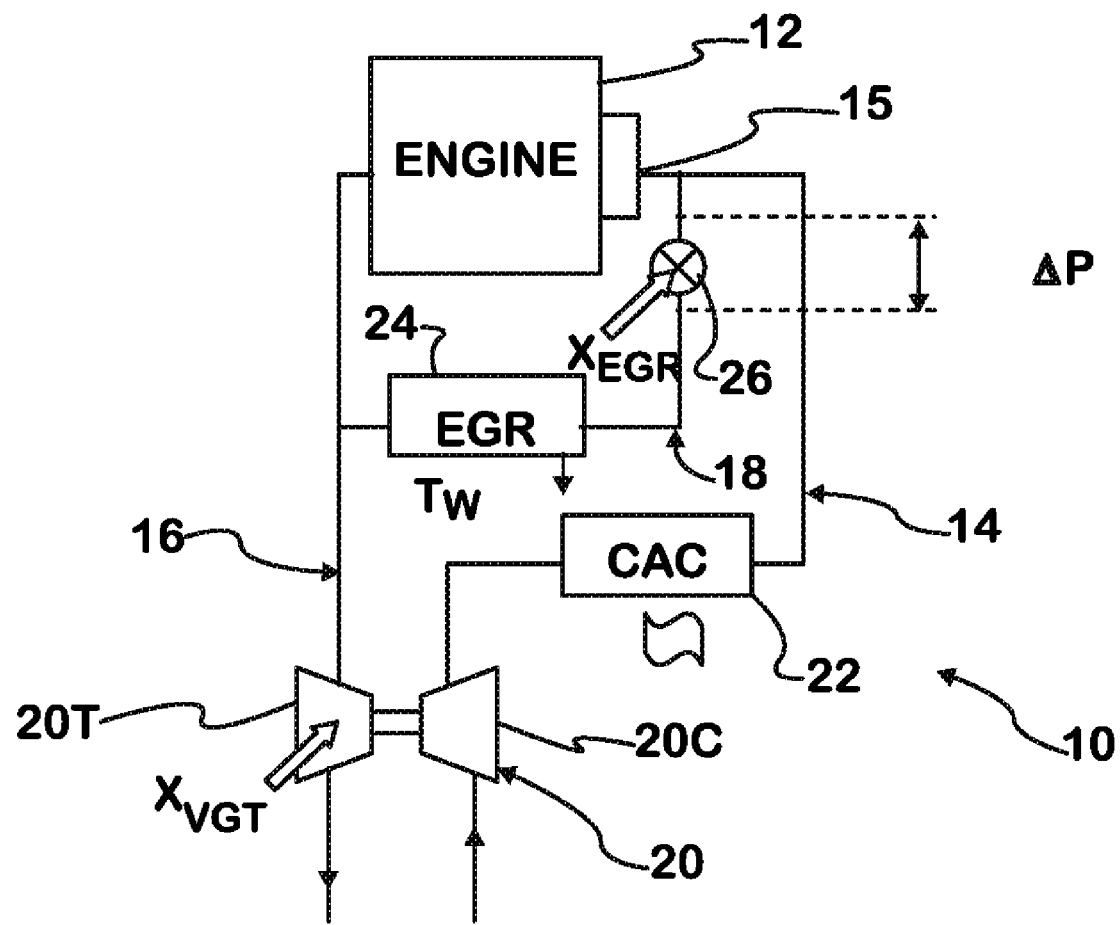
FIG. 1 is a general schematic diagram of a motor vehicle engine system.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 shows an exemplary internal combustion engine system 10 comprising an engine 12 containing cylinders in which combustion occurs, an intake system 14 including an intake manifold 15, through which charge air can enter engine 12, and an exhaust system 16 through which exhaust gasses resulting from combustion of air-fuel mixtures in the cylinders exit. An EGR system 18 provides for exhaust gas to be recirculated from exhaust system 16 to intake system 14.

Engine system 10 is representative of a turbocharged diesel engine comprising a turbocharger 20 that has turbine 20T in exhaust system 16 operating a compressor 20C in intake system 14. A charge air cooler 22 is downstream of compressor 20C.

EGR system 18 comprises an EGR cooler 24 through which exhaust gas passes before reaching an EGR valve 26 that is controlled by a duty-cycle signal applied to an electric actuator of the valve to set the extent to which the EGR valve is open.

Figure 2:
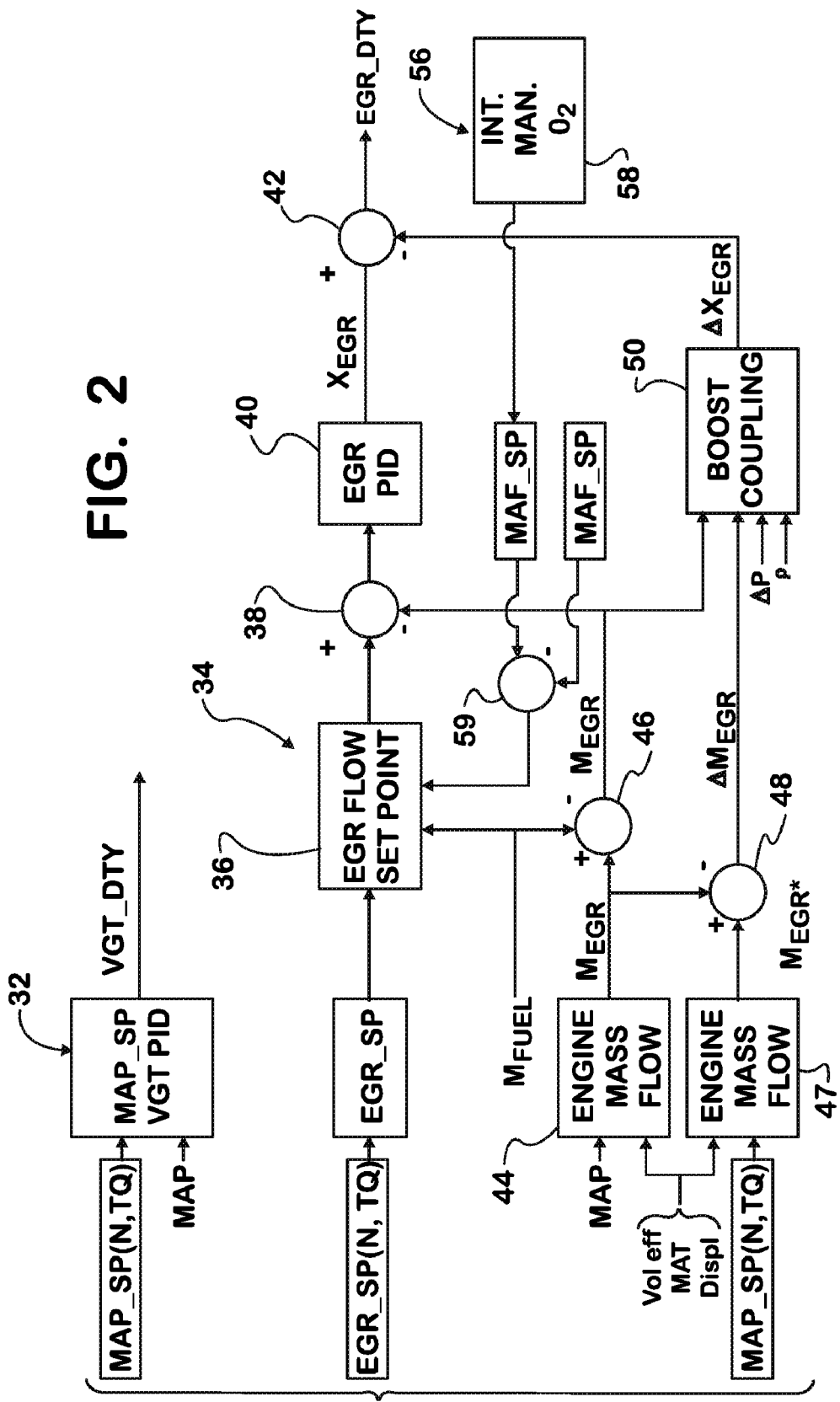
FIG. 2 is a schematic diagram illustrating principles of a strategy of the present invention.

An engine control strategy 30 is shown in FIG. 2. This strategy includes a turbocharger control strategy 32, a basic EGR control strategy 34 and an added intake manifold oxygen control strategy 56 of the present invention.

The control strategies 32 and 34 are embodied in one or more processors of an engine control system as algorithms for processing data, such as described in U.S. published application 2008/0078176, herein incorporated by reference. The turbocharger and/or the basic EGR control strategy could alternately be as described in U.S. Pat. No. 7,353,648; 6,973,382 or 6,401,700 all herein incorporated by reference.

The control strategy can include modeling EGR valve 26 such that for certain prevailing conditions, such as exhaust gas temperature and pressure differential across the valve, that bear on mass flow rate through the valve, a correlation between mass flow rate through the valve and the extent to which the valve is open is defined. In this way, the percent open position of the EGR valve 26 can measure the EGR gas mass flow rate. The strategy comprises a further map, or look-up table, containing data values for a parameter representing the extent to which EGR valve 26 is open. Each data value corresponds to a particular position of a movable valve element, such as a valve pintle, relative to a seat on which the movable element seats when closing the EGR valve to flow. The farther the movable element moves away from the seat, the more the valve opens.

A parameter that is indicative of pressure drop across EGA valve 26 is also utilized in this implementation of the strategy to develop the data value for EGR gas mass flow rate. The difference between exhaust backpressure (EBP), as measured by a suitable sensor at an exhaust manifold, and manifold absolute pressure (MAP), as measured by a MAP sensor at intake manifold 15, may be used to approximate pressure drop across the EGR valve 26.

Thus, data storage in the processors of the control system may be populated with data defining data values for $X_{EGR}$ each correlated with a respective pair of data values for differential pressure and mass flow rate.

As shown in FIG. 2, the general turbocharger control strategy is designated by the reference numeral 32. Vanes of turbine 20T are positioned by a duty cycle signal VGT_DTY applied to an actuator that sets vane position. Strategy 32 seeks to position the vanes so that compressor 20C develops boost corresponding to a desired boost set-point represented by a parameter MAP_SP(N,TQ). The control system uses engine speed N and indicated engine torque TQ to select an appropriate data value for MAP_SP(N,TQ) from a map for processing by strategy 32. Strategy 32 contains a closed-loop controller that compares a data value for actual boost, parameter MAP, with the desired set-point to develop an error signal that is processed to create a value for VGT_DTY that will secure correspondence of actual boost to the desired set-point.

The basic EGR control strategy is designated by the reference numeral 34. A desired set-point for EGR is represented by a parameter EGR_SP which, like the boost set-point, depends on engine speed N and indicated engine torque TQ, with the control system selecting an appropriate data value for EGR_SP from a map or look up table for processing by strategy 34.

Indicated engine torque is proportional to the area within the P-V (cylinder pressure-volume) diagram. It is essentially the useful torque being produced by the engine, corresponding to the torque at the clutch for propelling the vehicle plus torques used for other purposes such as operating a torque converter and engine-driven accessories like alternators and fuel pumps, and overcoming engine rotating friction.

A portion of the processing designated by the reference numeral 36 processes not only EGR_SP but also data representing engine fueling, parameter $M_{fuel}$, and the mass flow rate of fresh air entering intake system 14, parameter MAF. A data value for MAF is calculated in any suitably appropriate way, such as by converting an MAF sensor 60 (FIG. 3) output into a corresponding data value.

The result of processing 36 is used as one input to an algebraic summing function 38 that provides output data $X_{EGR}$ to an EGR PID controller 40 that in turn provides an input to another algebraic summing function 42. It is the output of summing function 42 that sets the duty cycle signal EGR_DTY applied to the actuator of EGR valve 26.

Strategy 34 comprises a suitably appropriate algorithm 44 that develops a data value for actual mass flow rate through engine 12, represented by a parameter $M_{eng}$. The data value for $M_{eng}$ is an input to an algebraic summing function 46. Actual mass flow is a function of several variables shown here as boost (MAP), air temperature (MAT), volumetric efficiency (Vol eff), and engine displacement (Displ). It is data values for those parameters that are processed by algorithm 44 to develop the data value for $M_{eng}$.

Strategy 34 further comprises a suitably appropriate algorithm 47 that develops a data value for mass flow rate through engine 12 that is based on the same variables processed by algorithm 44 except for MAP. Instead of using MAP, algorithm 47 uses desired boost set-point MAP_SP(N,TQ). The result provided by algorithm 47 is represented by a parameter $M_{eng}*$. The data value for $M_{eng}*$ is an input to an algebraic summing function 48.

Summing function 48 calculates the difference between $M_{eng}$ and $M_{eng}*$. The difference is represented by a parameter $\Delta M_{ENG}$ that is one of several inputs for a boost coupling algorithm 50. This algorithm performs calculations that yield a data value for a parameter $\Delta X_{EGR}$ that is subtracted by summing function 42 from the data value for $X_{EGR}$ provided by EGR PID controller 40.

Summing function 46 calculates the mass flow rate through EGR valve 26, represented by a parameter $\Delta M_{ENG}$, by subtracting from the data value for $M_{eng}$ the data values for MAF and $M_{fuel}$. The data value for $M_{EGR}$ is another input to algorithm 50. It is also subtracted by summing function 38 from the data value calculated by processing 36.

Additional inputs for algorithm 50 are parameters $\Delta P$ the pressure across the EGR valve and $\rho$ density.

During steady-state and near steady-state operation of the engine, there is little or no disparity between the data values for $\Delta M_{ENG}$ and $M_{ENG}$. As a result, boost coupling strategy 50 provides little or no adjustment of EGR via $\Delta X_{EGR}$ because the data value for $\Delta X_{EGR}$ is small or zero. The EGR mass flow rate error input to EGR PID controller 42 provides closed-loop control of EGR that continually forces the EGR rate toward the set-point EGR_SP.

During non-steady-state operation that is significantly more non-steady-state that merely near steady-state (sudden accelerations and decelerations for example), the disparity between the data values for $\Delta M_{ENG}$ and $M_{EGR}$ becomes significant. As a result, boost coupling strategy 50 provides adjustment of EGR via $\Delta X_{EGR}$ because the data value for $\Delta X_{EGR}$ has now become significant. EGR PID controller 42 still provides a closed-loop component to control of EGR by virtue of $\Delta X_{EGR}$, but the additional component provided by $\Delta X_{EGR}$ is quickly reflected in EGR_DTY because it is not delayed by the slower response that is inherent in the compromised design of the PID controller.

In a motor vehicle powered by engine system 10, a sudden depression of the acceleration pedal by the driver will cause EGR valve 26, if open, to be promptly operated in the direction of closing, quickly reducing the mass flow rate of exhaust gas through the EGR valve. The immediate effect is a corresponding reduction in exhaust gas being introduced into the engine cylinders. Because engine fueling is being quickly increased to accelerate the engine, the quickly reduced amount of EGR facilitates the ensuing in-cylinder combustion processes and turbocharger operation toward more quickly nulling out the boost discrepancy as the engine accelerates.

A sudden deceleration, like that resulting from release of the accelerator, will quickly drop the desired boost set-point. The control strategy causes EGR valve 26 to be promptly operated in its opening direction to quickly increase the mass flow rate of exhaust gas through the EGR valve so that more exhaust gas is introduced into the engine cylinders. The quickly increased amount of EGR can limit $NO_x$ formation during the deceleration.

The above-described basic EGR control strategy 34 is substantially disclosed in U.S. published application 2008/0078176.

The present invention adds an intake manifold oxygen control strategy 56, including a suitably appropriate algorithm 58, for more precisely controlling the excess oxygen ratio during combustion, to maintain as closely as possible ideal combustion, particularly during transients such as acceleration or deceleration.

Figure 3:
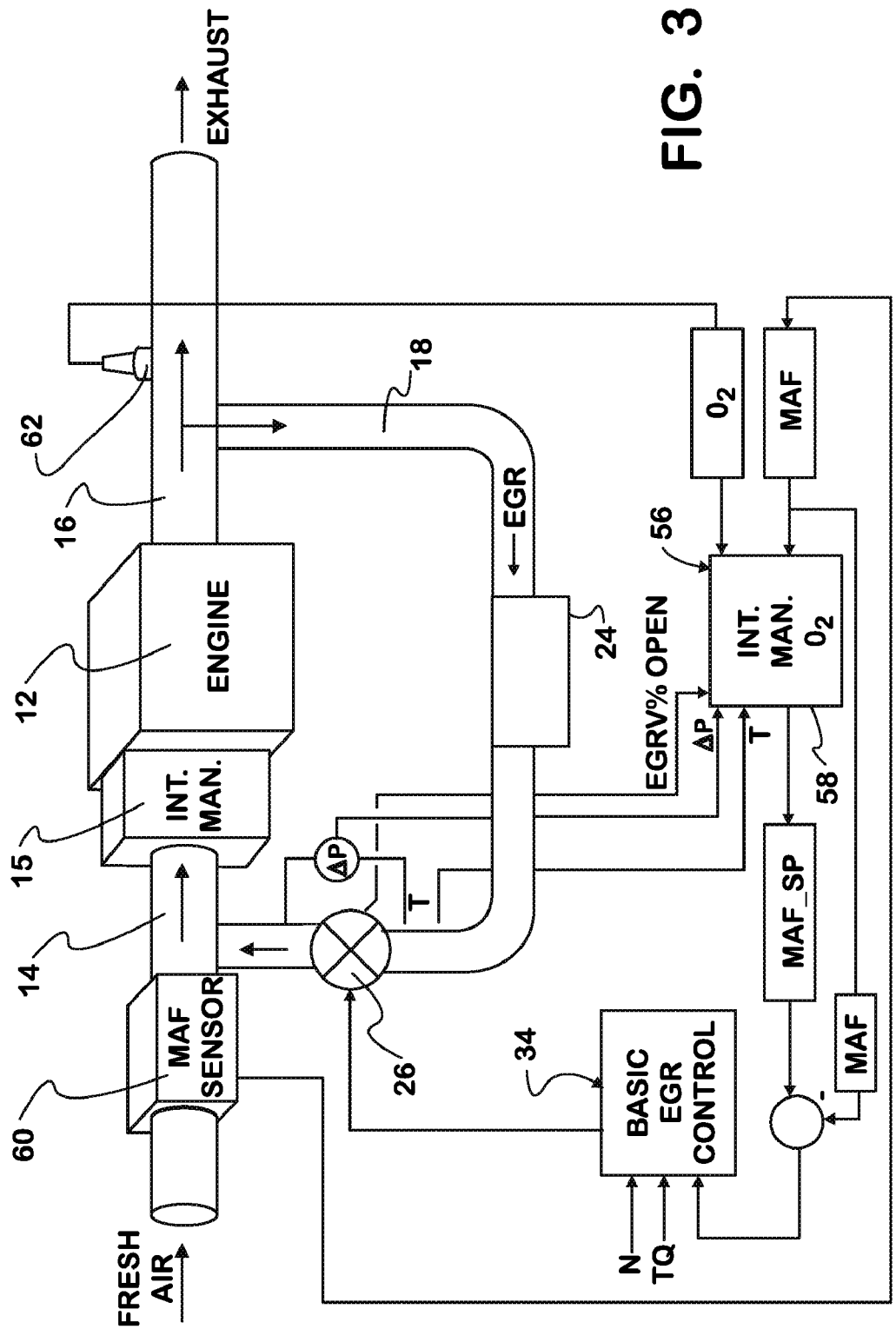
FIG. 3 is a schematic view of the intake manifold oxygen control of the present invention.

FIG. 3 illustrates the strategy in more detail. In FIG. 3, the basic EGR control strategy 34 of FIG. 2 is summarized in a single box. In FIG. 3, the intake system 14 is shown allowing fresh air to pass into the intake manifold 15 and into the cylinders of the engine 12. The exhaust gas output from the engine 12 enters exhaust system 16. Some of the exhaust from the engine 12 enters exhaust gas recirculation system 18 to be delivered through the cooler 24 and the EGR valve 26 to the intake system 14. The remainder of the exhaust gas is delivered into the exhaust system 18 and downstream into the turbine 20T (FIG. 1) and then into exhaust gas treatment devices (not shown), and out of the vehicle tailpipe.

An MAF sensor 60 is located within the intake system 14 and upstream of the EGR entry into the intake system 14. The MAF sensor outputs a signal corresponding to the actual mass flow rate of fresh air into the intake system 14.

An oxygen sensor 62 is present in the exhaust system 16. The oxygen sensor issues a signal corresponding to oxygen content of the exhaust gas to the engine control module (ECM) and the signal is used for engine control, as is known. According to the present invention, the oxygen signal is also used to calculate the oxygen content of the EGR gas, used in the strategy 56.

The exhaust gas from the engine 12 that does not pass into the EGR system 18 passes by the oxygen sensor 62. The algorithm 58 of the current invention uses the oxygen sensor 62 to detect the amount of oxygen present in the exhaust gas, and the exhaust gas passing through the EGR channel 18.

The control strategy 56 can include modeling EGR valve 26 such that for certain prevailing conditions, such as exhaust gas temperature and pressure differential across the valve, that bear on mass flow rate through the valve, a correlation between mass flow rate through the valve and the extent to which the valve is open is defined, as EGR % open. In this way, the percent open position of the EGR valve 26 can measure the EGR gas mass flow rate. The strategy comprises a further map, or look-up table, containing data values for a parameter representing the extent to which EGR valve 26 is open. Each data value corresponds to a particular position of a movable valve element, such as a valve pintle, relative to a seat on which the movable element seats when closing the EGR valve to flow. The farther the movable element moves away from the seat, the more the valve opens.

A parameter that is indicative of pressure drop across EGR valve 26 shown as $\Delta P$ is also utilized in this implementation of the strategy to develop the data value for EGR gas mass flow rate. The difference between exhaust backpressure (EBP), as measured by a suitable sensor at an exhaust manifold, and manifold absolute pressure (MAP), as measured by a MAP sensor at intake manifold 15, may be used to approximate pressure drop across the EGR valve 26.

In a diesel engine, the stoichiometric ratio of mass oxygen to mass fuel is 3.51. Knowing the desired amount of oxygen to be combusted in the engine, and using the EGR oxygen composition data of the gas inside EGR channel 18 and the settings of the valve 26, the algorithm 58 of the present invention calculates the exact amount of fresh air needed to be delivered into the intake manifold 15. The strategy 56 then controls an MAF set-point utilized by the basic EGR control strategy 34. The MAF set-point is compared to a measured MAF from the sensor 60 at a summing function 59 and the difference represents a error signal input to strategy 34.

Given a set total mass flow into the intake manifold, the MAF set-point is maintained by adjusting the EGR mass flow by controlling the EGR valve 26.

The algorithm 58 is based on the following relationships.

Excess Oxygen Ratio (R)

Excess oxygen ratio is the actual oxygen available for combustion divided by the theoretical oxygen requirement.

R=MFR_O2_IntMan/MFR_O2_Theory.

R=MFR_O2_IntMan/3.51(Fuel_Rate).

For ideal combustion, the excess oxygen ratio (R) is specified and controlled. At a given boost, intake manifold oxygen (MFR_O2_IntMan), and hence (R) can be varied by manipulating the EGR valve. The MAF sensor and exhaust $O_2$ sensor provide feedback.

Calculation of EGR $O_2$ Mass Flow Rate (MFR_O2_EGR)

The oxygen content of exhaust gas is less than the oxygen content of intake because some $O_2$ is consumed by combustion. The fuel rate is known so oxygen consumption can be estimated.

The balanced equation for hydrocarbon fuel and air is: $C8H18+12\frac{1}{2}O_2+47N2 \rightarrow 8C\ O_2+9H2O+47N2$.

The stoichiometric air mass ratio is: $A/F=[(12\frac{1}{2}'+47)(29)]/[8(12)+18(1)]=15.1$ lb air per lb fuel.

The stoichiometric $O_2$ mass ratio is: $O_2/F=[12\frac{1}{2}(32)]/[9(12)+18(1)]=3.51$ lb $O_2$ per lb fuel.

The calculation of exhaust manifold oxygen flow rate is:
MFR_O2_Exh=MFR_O2_IntMan−[Fuel_Rate(3.51)],
where MFR_O2_IntMan is the $O_2$ flow rate in the intake manifold.

The exhaust manifold $O_2$ fraction is O2_Exh=MFR_O2_Exh/Exhaust Flow Rate.

Measurement of EGR $O_2$ Mass Flow Rate (MFR_O2_EGR)

The oxygen concentration in EGR gas is the same as the oxygen concentration in the exhaust pipe. The $O_2$ fraction in the EGR can be measured by the $O_2$ sensor in the exhaust gas (percent oxygen). The EGR flow rate can be calculated.

Total engine flow rate=(MFR_EGR)+(MAF).
MFR_EGR=(Total Engine flow rate)−(MAF).
MFR_O2_EGR=MFR_EGR (Measured exhaust $O_2$ percent).

Calculation of Intake Manifold $O_2$ Mass Flow Rate (MFR_O2_IntMan)

Intake manifold flow rate is the sum of fresh air flow rate and EGR flow rate.
MFR_O2_IntMan=MFR_O2_Fresh+MFR_O2_EGR.

Calculation of Fresh Air $O_2$ Mass Flow Rate (MFR_O2_Fresh)
Air=21% $O_2$ by volume.
Molecular weight of air=29. Molecular weight of $O_2$=32.
Mass $O_2$=0.21(mass air)(32/29).
Mass flow rate $O_2$=0.21(mass flow rate of air)(32/29).
MFR_O2_Fresh=0.23(MAF), where MAF=lbs/min of fresh air.

Means to Achieving R Set-Point, Converting R_SP to MAF_SP

Today's EGR control schemes expect a MAF set-point.
Total engine air flow=desired EGR+MAF.
MAF set-point=(total engine flow)−(desired EGR).
MFR_O2_IntMan_SP=R_SP(3.51)(Fuel_Rate).
MFR_O2_Fresh_SP=(MFR_O2_IntMan_SP)−(MFR_O2_EGR).
MAF_SP=(MFR_O2_Fresh_SP)/0.23.

Figure 4:
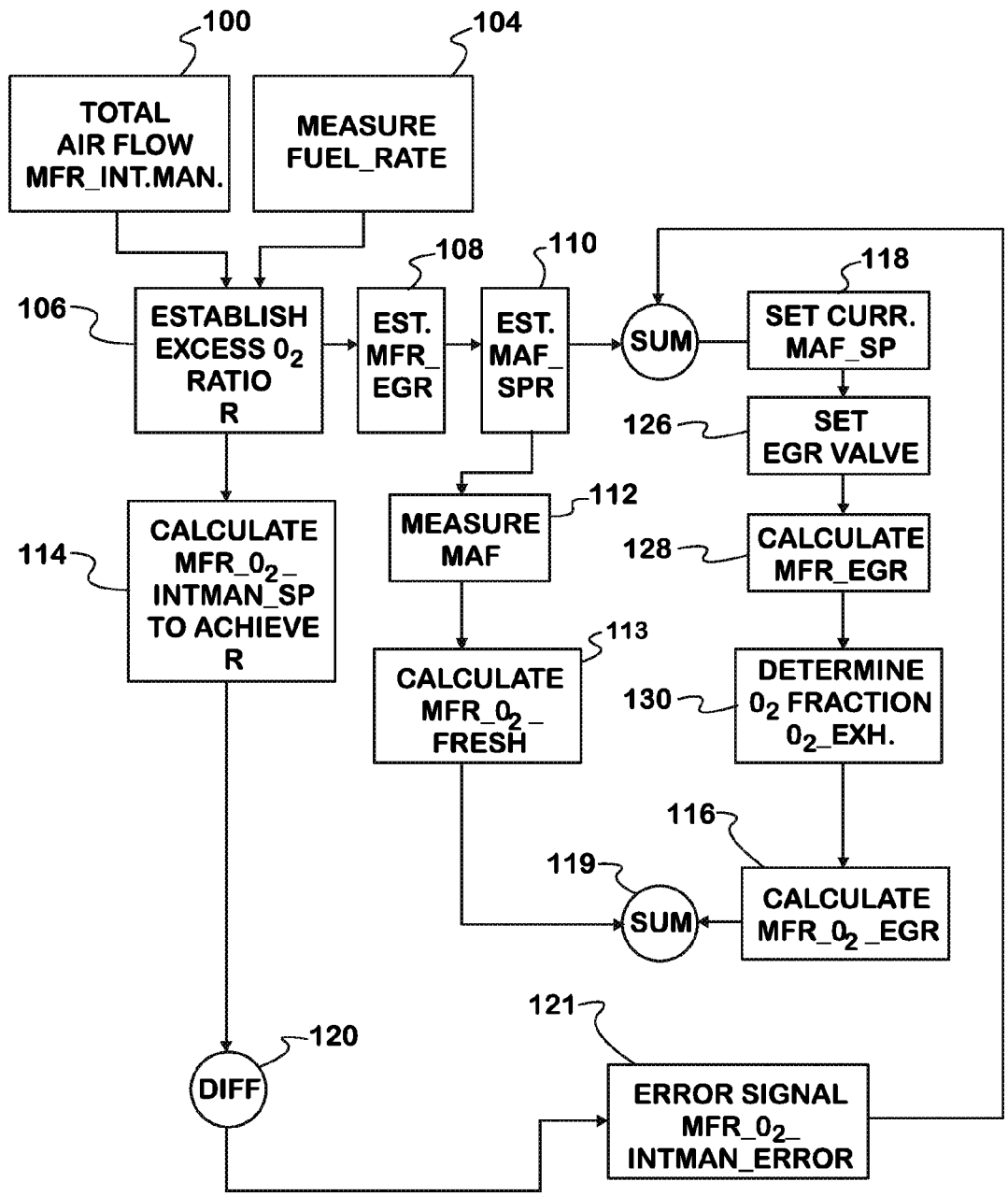
FIG. 4 is a method flow diagram of the invention.

Accordingly, as illustrated in FIG. 4, a method of the present invention for an engine having a fresh air inlet and an exhaust gas recirculation (EGR) circuit, provides the steps of:

for a given instantaneous total air flow, step 100 and fuel rate, step 104, into the intake manifold, establishing the ideal excess oxygen ratio R=MFR_O2_IntMan/(3.51)(Fuel_Rate) for combustion in the engine, step 106;

establishing a mass flow of EGR gas to be delivered to the intake manifold given total mass flow of both fresh air and EGR gas and adjusting the EGR valve 26 to pass this mass flow of EGR gas, step 108 which will also set the mass flow of fresh air MAF, step 110;

measuring mass flow of fresh air MAF to the intake manifold with the MAF sensor 60, step 112, to establish a measured mass flow of fresh oxygen, step 113;

calculating a desired total mass flow of oxygen to be delivered to the intake manifold of the engine to maintain the ideal excess oxygen ratio R, step 114;

determining a mass flow of EGR oxygen in the mass flow of EGR gas, step 116;

calculating a current desired mass flow of fresh oxygen (MAF_SP), step 118, to be delivered to the intake manifold such that the sum, step 119, of the current desired mass flow of fresh oxygen (MAF_SP) and the mass flow of EGR oxygen, is controlled to the desired or "set point" total mass flow of oxygen (MFR_O2_IntMan_SP), by determining the difference, step 120, between the current desired mass flow of fresh oxygen plus the mass flow of EGR oxygen and the desired total mass flow of oxygen (MFR_O2_IntMan_SP), and generating an error signal, step 121 that changes the current MAF_SP, step 118;

using strategy 56 and as applicable, a basic EGR strategy 34, re-adjusting the EGR valve to increase or decrease MFR_EGR, and conversely MAF, to change measured mass flow of fresh oxygen (step 113) in the direction toward the desired mass flow of fresh oxygen (MAF_SP), step 126.

The step of determining the mass flow of EGR oxygen in the mass flow of EGR gas, step 116, can include the steps of determining the mass flow of EGR gas (MFR_EGR), step 128 and then determining the Oxygen content of the EGR gas, step 130.

According to a first method, the step of determining a mass flow of EGR oxygen in the mass flow of EGR gas can comprise the steps of: measuring the oxygen content in the mass flow of EGR gas using the oxygen sensor 62, step 130; and measuring the mass flow of EGR gas using the pressure drop across the EGR valve and the EGR valve percentage open data and a map or look up table, step 128.

The steps shown in FIG. 4 are repeated rapidly, many times per second.

A second method of the present invention, provides the same steps as the first method except that the steps of determining a mass flow of EGR oxygen in the mass flow of EGR gas can comprise the steps of estimating a mass flow of EGR oxygen in the mass flow of EGR gas by an iterative process.

The step of estimating a mass flow of EGR oxygen in the mass flow of EGR gas can comprise the steps of: measuring the total engine mass flow and estimating the oxygen content in the exhaust gas. The total engine mass flow is a function of engine displacement, engine RPM, and intake manifold air density, which depends on intake manifold pressure or boost and volumetric efficiency, and temperature. These parameters can be determined or calculated in the engine control module using applicable sensors on the engine. The exhaust flow is substantially equal to the total engine mass flow. The oxygen content in the exhaust gas can be estimated by considering the total oxygen entering the intake manifold minus the oxygen consumed by stoichiometric combustion, using the formulas:
MFR_O2_Exh=MFR_O2_IntMan−[(Fuel_Rate)(3.51)],
and O2_Exh=MFR_O2_Exh/Exhaust Flow Rate. The mass flow of EGR gas can be calculated using the pressure drop across the EGR valve and the EGR valve percentage open data and a map or look up table, or by the calculation set forth below.

The O2 content in the exhaust (O2_Exh) is multiplied by the mass flow of the EGR gas (MFR_EGR) to derive an estimated mass flow of ERG O2 (MFR_O2_EGR). This estimated MFR_O2_EGR is used in step 116 of FIG. 4 to be added to the MFR_O2_Fresh wherein the remaining steps remain the same.

The steps are repeated rapidly, many times per second. The estimated O2 content will be corrected over the many iterations of the method steps.

A third method of the present invention for an engine having a fresh air inlet and an exhaust gas recirculation (EGR) circuit, provides the same steps as either the first or second methods except that to determine a mass flow of EGR gas, different steps are used. The different steps include the following steps. Using engine speed, engine displacement and density of air into the intake manifold, the total mass air flow through the engine that includes both mass flow of fresh air and mass flow of EGR gas is calculated. Rather than measuring mass flow of EGR gas, a mass flow of EGR gas to be delivered to the intake manifold is calculated as the difference between total mass air flow through the engine and the measured mass flow of fresh air by the MAF sensor.

The step of using engine speed, engine displacement and density of air into the intake manifold is further defined in that the density of air into the intake manifold can be a function of temperature, pressure or turbocharger boost and volumetric efficiency. These parameters can be transmitted by sensors and/or calculated in the engine control unit (ECU).

The above methods are described for a single operating point only with the understanding that in a real dynamic engine, the total mass flow of air through the engine would not be constant. The total mass flow of air through the engine will change with engine rpm and turbocharger boost for example. When the total mass flow of air changes, the strategies will however quickly change for a new total mass flow of air through the engine, and/or a new fuel rate. The method steps of any of the methods are repeated rapidly, many times per second.

Figure 5:
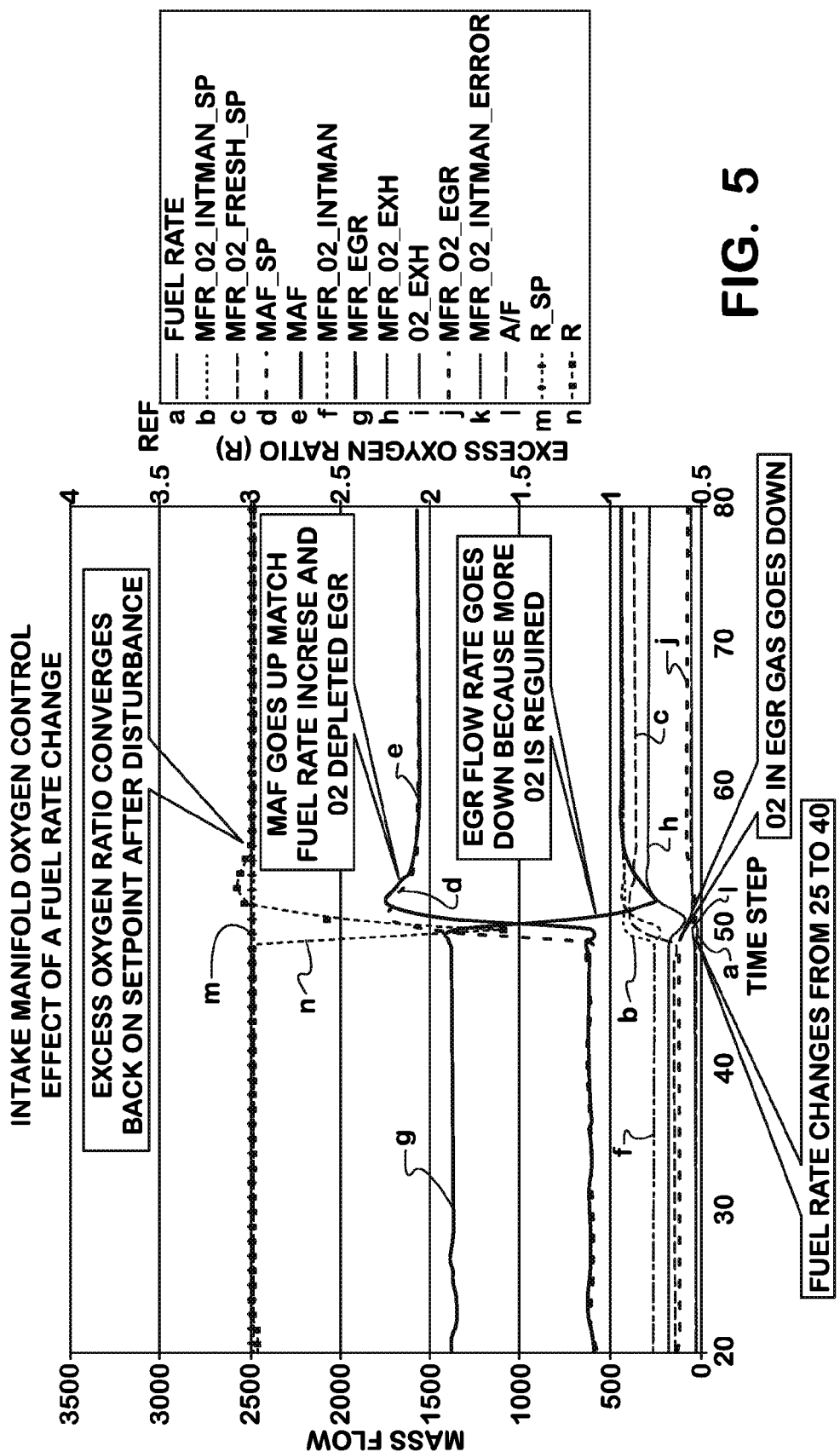
FIG. 5 is a graph plot useful in explaining the results of the strategy of the present invention.

FIG. 5 illustrates a modeled result of the strategy 56 of the present invention. FIG. 4 illustrates the occurrence of a transient and the effect on excess oxygen ratio in the engine. At approximately time=49 seconds onward, the vehicle accelerator is depressed and fuel mass flow rate increases from 25 lbs/hr to 40 lbs/hr. As explained above, the EGR flow rate decreases because more $O_2$ is consumed by the combustion process. Thus, the $O_2$ contributed by EGR gas decreases. According to strategy 56, the MAF_SP is increased and the measured MAF increases to match the fuel rate increase and also the MAF_SP increases to compensate for the depletion of $O_2$ contributed by the EGR gas. As shown in FIG. 4, the excess oxygen ratio converges back to be on set-point for an ideal combustion-excess oxygen ratio for the new fuel flow rate=40 lbs/hr.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A method for controlling an engine having a fresh air inlet and an exhaust gas recirculation (EGR) circuit, comprising the steps of:
    establishing a pre-selected excess oxygen ratio for combustion in the engine;
    establishing a mass flow of EGR gas to be delivered to the intake manifold given total mass flow of both fresh air and EGR gas and adjusting the EGR valve to pass this mass flow of EGR gas;
    measuring mass flow of fresh air to the intake manifold to establish a measured mass flow of fresh air;
    calculating a desired total mass flow of oxygen to be delivered to the intake manifold of the engine to maintain the ideal excess oxygen ratio;
    determining a mass flow of EGR oxygen in the mass flow of EGR gas;
    calculating a desired mass flow of fresh oxygen to be delivered to the intake manifold such that the sum of the desired mass flow of fresh oxygen and the mass flow of EGR oxygen is equal to the desired total mass flow of oxygen;
    calculating an adjusted mass flow of fresh air to supply the desired mass flow of fresh oxygen;
    re-adjusting the EGR valve to cause a change to the mass flow of EGR gas and a change in the measured mass flow of fresh air in the direction toward the adjusted mass flow of fresh air.

2. The method according to claim 1, wherein said step of establishing the ideal excess oxygen ratio is based on a known amount of fuel delivery to the engine and a pre-set ratio of mass of oxygen to mass of fuel occurring in combustion.

3. The method according to claim 1, wherein the step of establishing a mass flow of EGR gas can be based on a map of values that depend on engine speed and indicated torque.

4. The method according to claim 1, wherein said step of determining a mass flow of EGR oxygen in the mass flow of EGR gas comprises the steps of
    measuring the oxygen content in the mass flow of EGR gas; and
    measuring the mass flow of EGR gas.

5. The method according to claim 4, wherein said step of measuring the oxygen content is conducted using an oxygen sensor.

6. The method according to claim 1, wherein said step of re-adjusting the EGR valve is further defined in that a set-point signal for said adjusted mass flow of fresh air is an output value that is produced to be an input value into another, supplemental algorithm for adjusting the EGR valve.

7. The method according to claim 1, wherein said steps are repeated rapidly.

8. The method according to claim 1, wherein said step of determining a mass flow of EGR oxygen in the mass flow of EGR gas comprises the steps of
    determining a total mass flow rate of intake manifold air equal to the sum of the mass flow of fresh air and the mass flow of EGR gas;
    determining the mass flow rate of exhaust oxygen as the difference between the desired total mass flow of oxygen, and the product of the fuel rate and the stoichiometric ratio of mass oxygen to mass fuel;
    determining the fraction of O2 in the exhaust gas by dividing the mass flow rate of exhaust oxygen by the total mass flow rate of intake manifold air; and
    multiplying the fraction of O2 by the mass flow of EGR gas.

9. The method according to claim 1, wherein said step of determining a mass flow of EGR oxygen in the mass flow of EGR gas comprises the steps of:
    determining a total mass flow rate of intake manifold air from engine speed, engine displacement and density of intake manifold air;
    measuring mass flow of fresh air from a sensor;
    subtracting mass flow of fresh air from said total mass of intake manifold air to determine mass flow of EGR gas;
    determining the mass flow rate of exhaust oxygen as the difference between the desired total mass flow of oxygen, and the product of the fuel rate and the stoichiometric ratio of mass oxygen to mass fuel;
    determining the fraction of O2 in the exhaust gas by dividing the mass flow rate of exhaust oxygen by the total mass flow rate of intake manifold air; and
    multiplying the fraction of O2 by the mass flow of EGR gas.

10. A method for coordinating control of exhaust gas recirculation from a exhaust system of a turbocharged internal combustion engine to an intake system of the engine, the method comprising:
    developing data representing a mass flow rate of fresh air that is entering the intake system;
    calculating data representing a mass flow rate of recirculated exhaust gas that is mixed with the fresh air entering the intake system by calculating data representing mass flow rate through the engine cylinders and calculating the difference between the data representing the calculated mass flow rate through the engine cylinders and the data representing the mass flow rate of fresh air entering the intake system;

adjusting an EGR valve to pass the mass flow rate of recirculated exhaust gas;

establishing an ideal excess oxygen ratio for combustion in the engine;

measuring mass flow of fresh air to the intake manifold;

calculating a desired total mass flow of oxygen to be delivered to an intake manifold of the engine to maintain the ideal excess oxygen ratio;

determining a mass flow of EGR oxygen in the mass flow of recirculated exhaust gas;

calculating a desired mass flow of fresh oxygen to be delivered to the intake manifold such that the sum of the desired mass flow of fresh oxygen and the mass flow of EGR oxygen is equal to the desired total mass flow of oxygen;

calculating an adjusted set-point mass flow of fresh air to supply said desired mass flow of fresh oxygen; and re-adjusting the EGR valve for an adjustment of the mass flow rate of recirculated exhaust gas in a direction of adjustment that seeks to null out the difference between said measured mass flow of fresh air and said adjusted set-point mass flow of fresh air.

11. The method according to claim 10, wherein said step of establishing an ideal excess oxygen ratio is based on a known amount of fuel delivery to said engine and a preferred ratio of mass of oxygen to mass of fuel occurring in combustion.

12. The method according to claim 11, wherein said step of establishing the mass flow of recirculated exhaust gas is based on a map of values that depend on engine speed and indicated torque.

13. The method according to claim 10, wherein said step of determining a mass flow of EGR oxygen in the mass flow of EGR gas comprises the steps of:

measuring the oxygen content in the mass flow of recirculated exhaust gas; and measuring the mass flow of recirculated exhaust gas.

14. The method according to claim 13, wherein said step of measuring the oxygen content is conducted using an oxygen sensor.

15. The method according to claim 10, wherein said step of re-adjusting the EGR valve for an adjustment of the mass flow rate of recirculated exhaust gas in a direction of adjustment that seeks to null out the difference between said measured mass flow of fresh air and said adjusted set-point mass flow of fresh air comprises issuing a mass flow of fresh air set-point signal that is an input signal into another, supplemental algorithm for adjusting the EGR valve.

16. The method according to claim 10, wherein said steps are repeated rapidly.

17. The method according to claim 10, wherein said step of determining the mass flow of EGR oxygen in the mass flow of recirculated exhaust gas comprises the steps of:

determining a total mass flow rate of intake manifold air equal to the sum of the mass flow of fresh air and the mass flow of recirculated exhaust gas;

determining the mass flow rate of exhaust oxygen as the difference between the desired total mass flow of oxygen, and the product of the fuel rate and the stoichiometric ratio of mass oxygen to mass fuel;

determining the fraction of O2 in the exhaust gas by dividing the mass flow rate of exhaust oxygen by the total mass flow rate of intake manifold air; and multiplying the fraction of O2 by the mass flow of recirculated exhaust gas.

18. The method according to claim 10, wherein said step of determining a mass flow of EGR oxygen in the mass flow of recirculated exhaust gas comprises the steps of:

determining a total mass flow rate of intake manifold air from engine speed, engine displacement and density of intake manifold air;

measuring mass flow of fresh air from a sensor;

subtracting mass flow of fresh air from said total mass of intake manifold air to determine mass flow of recirculated exhaust gas;

determining the mass flow rate of exhaust oxygen as the difference between the desired total mass flow of oxygen, and the product of the fuel rate and the stoichiometric ratio of mass oxygen to mass fuel;

determining the fraction of O2 in the exhaust gas by dividing the mass flow rate of exhaust oxygen by the total mass flow rate of intake manifold air; and multiplying the fraction of O2 by the mass flow of recirculated exhaust gas.

* * * * *